UNITED STATES PATENT OFFICE.

CHARLES C. PARSONS, OF HEMPSTEAD, NEW YORK, ASSIGNOR TO JULIA M. PARSONS, OF SAME PLACE.

DETERGENT.

SPECIFICATION forming part of Letters Patent No. 382,322, dated May 8, 1888.

Application filed September 14, 1886. Serial No. 213,532. (No specimens.)

*To all whom it may concern:*

Be it known that I, CHARLES C. PARSONS, a citizen of Hempstead, county of Queens, and State of New York, have invented a new and useful Detergent Compound and Process for Making the Same, of which the following is a full, clear, and accurate description.

My present invention relates to improvements in that class of detergent compounds in which ammonia is employed as one of the ingredients; and it is an improvement upon the invention patented to me by United States Letters Patent, dated November 14, 1882, No. 267,455.

The invention described and claimed by me in the aforesaid patent consisted, among other things, in dehydrating the ammoniacal salt, as well as the other substances employed, previous to mixing them, thus bringing all the component parts to a dehydrated and preferably granular condition, which mixture, being incased in suitable wrappers, retained their dehydrated granular condition until subjected to the action of water or other solvent at the time of use, which solvent dissolving the several ingredients freed the ammonia and developed its detergent qualities. I found that, although my said invention was very valuable for certain purposes, there were two limitations to its general employment: first, that I was obliged to use such soap ingredients as could be readily dehydrated prior to mixing, and which were not deliquescent, and such ingredients I found were too expensive for ordinary household or laundry use, and, second, that if the packages containing the mixture were left open or exposed to a damp atmosphere—such as in a laundry—for any considerable time a decomposition of the ammoniacal salt resulting in loss of ammonia was apt to take place.

My present invention obviates the said objections or limitations, and enables me to compound my ammoniacal salt with other ingredients without the necessity for the previous dehydration of any of the ingredients and without danger of loss of ammonia either in process of manufacture or subsequently; and my present invention, more specifically stated, consists in interposing between the grains or particles of the ammoniacal salt and the alkaline or equivalent substances in the compound as might decompose it some material which will prevent or lessen contact between these substances, thus preventing or lessening the chemical action and decomposition, which would cause loss or waste of the ammonia; and this protecting substance may be applied as a coating directly upon the particles of the ammoniacal salt itself; or, inasmuch as its interposition between the ammoniacal salt and the decomposing ingredient or ingredients is the essential feature, it is obvious that the protecting substance may be applied to them instead of to the ammonia, contact and chemical action between these two bodies being prevented in either case; and if the detergent compound is to be exposed to excessive moisture—such, for instance, as for marine use, the coating of protecting material may be applied to both the particles of the ammoniacal salt and also to the alkaline or equivalent bodies in the mixture as might cause decomposition in the presence of moisture. The protecting material, however, must be of such a nature and so applied that while it will protect the ammoniacal salt during ordinary exposure it will not prevent the development of the detergent qualities of the ammonia when the whole mixture is immersed in water or other solvent, as during use.

I have found that there are quite a number of substances which can be beneficially employed as the protecting medium. Among them are a heavy-bodied paraffine-oil, resin-oil, resinous varnish, (as, for example, one composed of ten parts of common resin and one part of resin-oil dissolved in twenty parts of naphtha,) or a glue, or a size, or paraffine-wax may be employed, and I have found that a very satisfactory way of applying these protecting materials to the particles of the ammoniacal salt and to the decomposing bodies, as the case may be, is to reduce the protecting material to a liquid form and then by suitable mechanical means, and with or without heat, depending on the nature of the protecting material used, stir the ammoniacal salt or the decomposing body or bodies into the protecting liquid until it is thoroughly coated. It is then taken out and dried in any convenient manner.

I have found that my invention, which fundamentally consists, as above stated, in a mechanical mixture of an ammoniacal salt with some alkaline body or equivalent, contact between these bodies being prevented, as above stated, may be employed advantageously in three distinct classes of detergents.

First. A detergent mixture, such as above described, in which the ammoniacal salt and decomposing bodies are mixed together subsequent to the application of the protecting material without the presence of any saponaceous compound or any other ingredients. As an example of such a detergent, I have obtained excellent results from the following, to wit: sixty-six parts of a granulated sulphate of ammonia or other ammoniacal salt in equivalent proportions and sixty parts of a good grade of soda-ash, also granulated, mixed together, protected as above stated. Instead of the soda-ash, however, any caustic or carbonated alkali or alkaline earth, or equivalent body which will react on the ammoniacal salt and free the ammonia, may be used in suitable proportions.

Second. For the production of a saponaceous detergent especially applicable to household purposes, I combine the above-described mixture of soda-ash and protected ammoniacal salt with a soap powder in any desired proportions—equal parts will give good results. If a small proportion of ammoniacal salt is used, the alkali in the soap will serve to decompose the ammoniacal salt and liberate the ammonia, and the amount of soda-ash may be proportionately diminished. For convenience of use the resulting mixture of soap-powder and ammoniacal compound may be packed in any convenient receptacle of wood, paper, or other suitable material; but for many purposes I prefer that the mixture should be formed by suitable pressing apparatus into cakes of any desired shape or size, the cake thus produced being, so far as I am informed, the first instance ever known in which an ammoniacal salt has been uniformly distributed throughout the cake and at the same time protected from such decomposition as would occasion loss or waste of the ammonia.

Third. The protected ammoniacal salt may be used in a detergent mixture, saponaceous or otherwise, in which there are mixed one or more insoluble bodies, which clean mechanically and not chemically—such, for instance, as pumice-stone, meal, fine sand, and the like. I prefer to use all the ingredients in a granular or powdered condition, because the application of the protecting material is thereby rendered more perfect and the mixture more uniform; but I do not limit myself thereto, because for cheap detergents to be used in large quantities lumps of considerable size both of the ammoniacal salts and also of the alkaline or equivalent decomposing bodies may be used.

I am aware that it is not new to incorporate an ammoniacal body in soap compounds, such use of ammonia in various forms having been set forth in the United States Letters Patent granted Sprague, No. 50,180, dated September 26, 1865, and granted to Stanton, No. 183,986, dated October 31, 1876, and in the English Letters Patent granted Rowland, No. 1,410, dated May 19, 1857, and I do not claim, broadly, such use of ammonia. In none of the instances cited has my invention been described, the essential feature of which is the isolation of the ammoniacal salt from the alkaline bodies in a soap by the use of a protecting-coating applied as above described, by which means I secure the permanency of the ammonia in the detergent, which permanency is entirely wanting in the compounds above referred to.

I do not herein claim that part of my invention above described which relates to the production of a saponaceous detergent without additional alkali and embodying my invention; but I do not abandon the same, and under the rulings of the Patent Office I have filed another application for that part of my invention, it being Serial No. 250,163, filed September 20, 1887.

Having described my invention, what I desire to claim, and secure by Letters Patent, is—

1. A detergent compound containing an ammoniacal salt and one or more alkaline or equivalent substances to set free the ammonia, in which compound the loss or waste of ammonia is prevented during manufacture and until use by a coating of protecting material placed between the granules or particles of the ammoniacal salt and the alkaline or other ingredients of the compound which might cause decomposition of said salt, substantially as set forth.

2. A detergent compound containing an ammoniacal salt, one or more saponaceous bodies, and sufficient additional alkaline or equivalent substance or substances to set free the ammonia, in which compound the loss or waste of ammonia is prevented during manufacture and until use by a coating of protecting material placed between the granules or particles of the ammoniacal salt and the alkaline or other ingredients of the compound which might cause decomposition of said salt, substantially as set forth.

3. A cake of ammoniacal soap containing a soap-powder, a granulated or powdered ammoniacal salt, and sufficient additional alkaline or equivalent substance or substances to set free the ammonia, and a protecting compound to prevent loss of ammonia during manufacture and until use, the whole mixed together and then formed into a cake or block, substantially as set forth.

4. A detergent compound containing a soap-powder and ammoniacal salt and sufficient additional alkaline or equivalent substance or substances to set free the ammonia, in which compound the loss of ammonia is prevented during manufacture and until use by a coating of protecting material placed between the granules or particles of the ammoniacal salt and the alkaline or other ingredient of the compound which might cause decomposition of said salt, substantially as set forth.

CHARLES C. PARSONS.

Witnesses:
S. A. GOLDSCHMIDT,
TIMOTHY CURTIN.